March 17, 1936.        S. N. HOLMAN        2,034,298
AIRCRAFT TOY
Filed Oct. 19, 1934        2 Sheets-Sheet 2
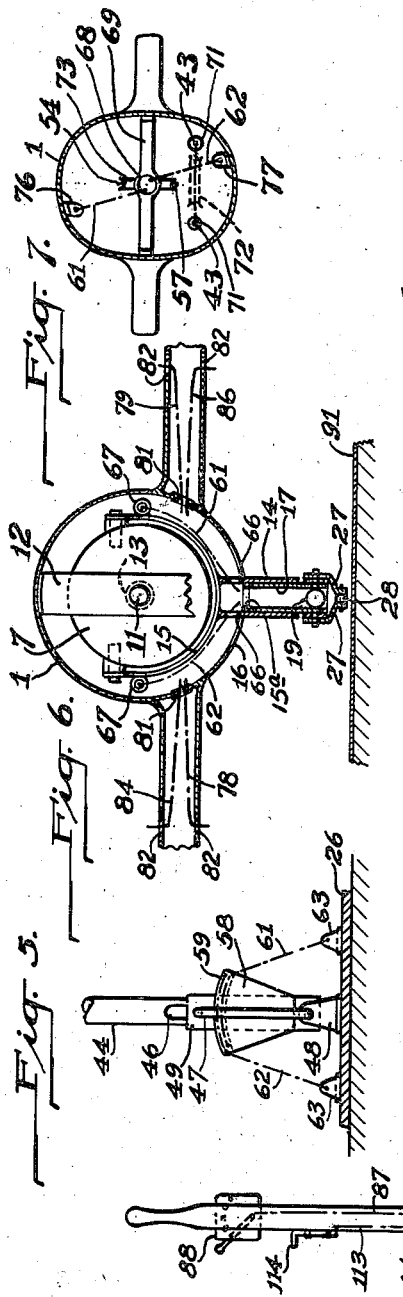
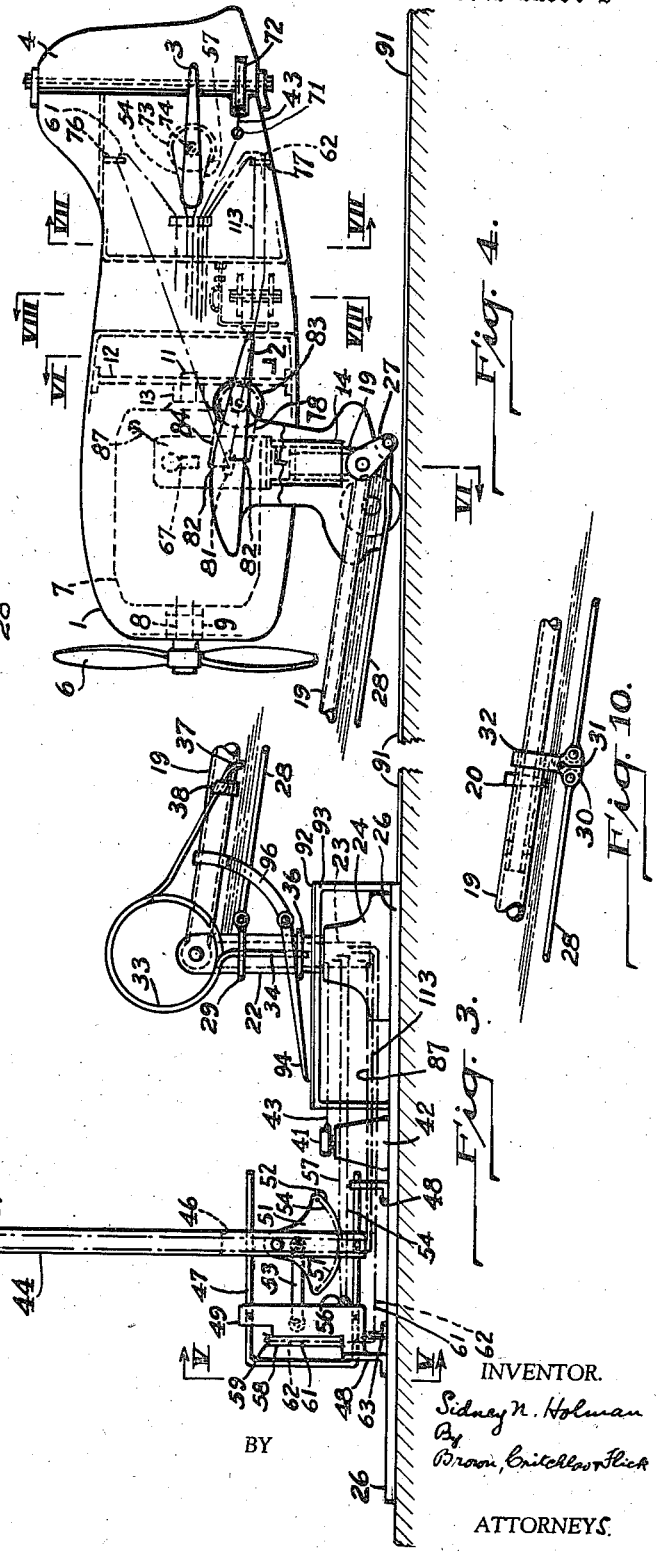
WITNESSES
A. B. Wallace
V. A. Peckham
INVENTOR.
Sidney N. Holman
BY
Brown, Critchlow & Flick
ATTORNEYS.

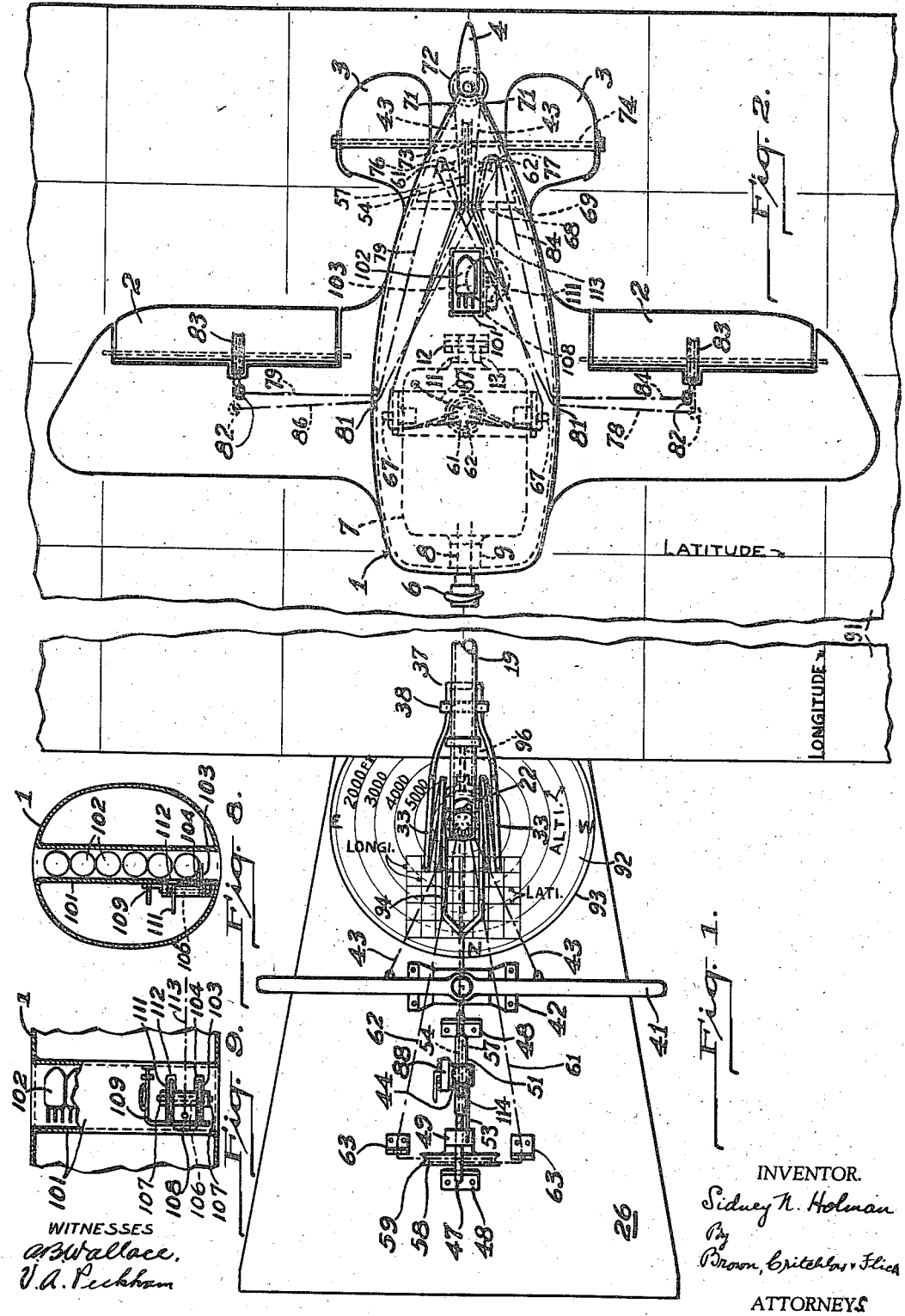

Patented Mar. 17, 1936

2,034,298

UNITED STATES PATENT OFFICE 2,034,298

AIRCRAFT TOY

Sidney N. Holman, Mount Washington, Pa.

Application October 19, 1934, Serial No. 749,021

7 Claims. (Cl. 35—12)

This invention relates to aircraft toys.

Children generally favor up-to-date toys; therefore, there is a large demand for aircraft toys. However, with the exception of model airplanes which actually fly, the interest in an aircraft toy is soon lost and the toy discarded because there is nothing particularly interesting that can be done with it. After a child has pulled such a toy around or hung it on a string so that he can sail it around the room, he has just about exhausted the possibilities of entertainment that can be derived from the toy. He is then through with it and looking for something new with which to entertain himself.

It is among the objects of this invention to provide an aircraft toy which is adapted to be played with in such a manner that it retains its fascination and entertainment value indefinitely, which involves the use of skill when played with to full advantage, and which is in the nature of a highly interesting game. Further objects are to provide such a toy which is strong, durable and educational.

Accordingly, this aircraft toy includes four major parts; namely, an aircraft-simulating toy, a control station, an aircraft support connecting them, and aircraft position-indicating means. In the preferred embodiment of the invention the aircraft-simulating toy, such as a model airplane, has the usual control surfaces that guide an airplane in flight and a propeller preferably driven by an electric motor mounted in the airplane. The airplane is mounted for universal movement on one end of an elongate airplane support which is movably mounted at its opposite end on a control support to permit its free end to move vertically and laterally. Manually operable aircraft controls are mounted on the control support and are connected to the control surfaces of the airplane by cords or wires. Consequently, when the controls are operated the air forced over the control surfaces by the propeller causes the airplane to respond to the positions of its control surfaces in the same manner as a real airplane. The anchored end of the elongate support is provided with a spring capable of compensating for the weight of the airplane so that the latter can rise in the air when the control surfaces are positioned for that purpose.

To add to the fascination of manipulating the airplane in the air a chart is disposed adjacent the controls, and the direction of flight and relative positions of the airplane are indicated on the chart by a pointer connected to the elongate support. A large map is laid beneath the airplane, and the location-finding lines on the map and chart are so related that any point on the map directly below the airplane is indicated on the chart. By providing the airplane with a remotely controlled dispenser, bombs, mail bags, parachutes and the like can be dropped at desired points over the map by directing the plane to those points by using the chart. Likewise, interesting accessories can be used with the toy, such as advertising signs adapted to be towed through the air by the plane, and buildings and bridges which fall apart when struck by a falling toy bomb.

The preferred embodiment of the invention is illustrated in the accompanying drawings in which Figs. 1 and 2 are plan views of the toy; Figs. 3 and 4 are side views thereof; Fig. 5 a view taken on the line V—V of Fig. 3; Figs. 6, 7 and 8 views taken on the lines VI—VI, VII—VII and VIII—VIII, respectively, of Fig. 4; Fig. 9 a side view, partly in section, of a bomb dispenser mounted in the airplane; and Fig. 10 an enlarged fragmentary view of the sectional tube and rod connecting the plane to its support.

Referring to Figs. 2 and 4 of the drawings, the aircraft is preferably in the form of a monoplane I having the usual movable control surfaces, i. e., ailerons 2, elevators 3 and rudder 4, and a propeller 6 preferably driven by an electric motor 7 mounted in the airplane; and Fig. 10 an enlarged The drive shaft 8 of the motor projects through a bushing 9 mounted in the nose of the airplane, and the rear end of the motor is provided with an axially projecting shaft 11 oscillatably mounted in a bracket 12 in the center of the fuselage, a sleeve 13 on shaft 11 maintaining the motor in its forward position.

As shown in Fig. 6, the immediate support for the airplane is a yoke consisting of short tube 14 on the upper end of which is rigidly mounted a bifurcated bracket 15. The upper ends of the bracket arms are pivoted to opposite sides of motor 7 slightly above its center of gravity and in such position longitudinally of the motor as to cause the airplane to balance in the bracket. Due to the pivotal mounting of the motor in the airplane fuselage and in the yoke, universal movement of the airplane relative to its support is permitted, the bottom of the fuselage being provided with an enlarged opening 16 through which tube 14 extends.

Short tube 14 is provided interiorly with a shoulder 15a and telescopes loosely over an upright tube 17 which is hinged to the free end of a tubular support 19 several feet in length and preferably composed of several sections that can be telescoped by removing tapered pins 20 (Fig. 10) to shorten the support when not in use. As shown in Fig. 3, the opposite end of long tube 19 is hinged to the upper end of a short upright tube 22 which telescopes loosely over a short anchor tube 23 mounted on a bracket 24 secured to the front end of control support 26, tube 22 resting on the bracket.

In order to maintain tube 17 upright at all times regardless of the position of long tube 19, the lower end of tube 17 is provided with a pair of downwardly and forwardly extending arms 27 (Fig. 4) between the lower ends of which one end of a sectional rod 28 is pivoted. The opposite end of the rod is pivoted on a horizontal axis to a radial flange 29 on the upper portion of upright tube 22 (Fig. 3) whereby when the free end of long tube 19 is elevated the rod 28 pulls back on arms 27 and holds tube 17 upright. As shown in Fig. 10, the ends of the sections making up rod 28 are pivoted in small brackets 30 which in turn are suspended from pivot pins 31 removably disposed in brackets 32 hung on long tube 19 so that the rod can be folded up when the long tube is telescoped for packing away.

A loop spring 33 is disposed above anchor bracket 24 with its depending legs 34 projecting through holes in tube flange 29 and a second radial flange 36 below it, and with its forward end portion 37 sprung down beneath long tube 19. A cross piece 38 is disposed between this forward portion of the spring and the long tube along which it is slidable for varying the tension of the spring. The purpose of this spring is to compensate for the weight of the airplane and long tube 19 so that the airplane can be raised with very little effort. The rear portion of control support 26 extends back far enough to permit the legs of a chair or the like to be placed on it. The operator of the plane sits in the chair so that his weight holds down the control support which would otherwise be tilted up by the weight of the plane.

To permit the airplane to rise from the floor and to control its movements and position in the air, controls similar to the controls in real airplanes are mounted on control support 26. These controls are connected by cords or fine wires to the movable control surfaces of the airplane for actuating them from the control station. Although the cords may pass through all of the tubes, it is preferable that they pass up through upright tubes 23 and 22, out of tube 22 below long tube 19, along the latter through brackets 32, and up through upright tubes 17 and 14 into the plane, suitable openings being provided in the walls of the various tubes to permit the cords to pass in and out of them. These cords are indicated by dot and dash lines in order to avoid confusion with the other straight lines of the drawings, and for the same reason all of the cords are not shown for their full length where the location of the omitted portions is clear.

One of the controls is a foot operated rudder bar 41 pivotally mounted on a bracket 42 attached to the control support directly behind tube anchoring bracket 24 (Figs. 1 and 3). A cord 43 is attached to the rudder bar at each side of its pivotal axis, the two cords entering the tubes either through the lower end of anchor tube 23 or through a suitable aperture in its side wall.

For controlling the ascending and descending of the airplane and its lateral inclination to the horizontal, the control support is provided with the usual manually operable control stick 44 the lower portion of which is provided with a longitudinal slot 46. Extending through this slot are the upper and lower legs of a U-shaped rod 47, the lower end of the control stick being pivoted to the lower leg of the rod which in turn is pivoted at its ends in a pair of brackets 48 attached to the control support. An upright block 49 is attached to both legs of rod 47 directly in front of the rear bracket 48, thereby preventing the rod from slipping out of the brackets. With this construction the control stick can be moved backward and forward whether it is upright or laterally inclined, and when it is moved laterally it tilts rod 47 with it.

Pivotally mounted in stick slot 46 between the legs of the U-shaped rod is a segment member 51 (Fig. 3) having a grooved rim 52. Between the pivot point of the segment and its rim the segment is pivoted to a link 53 the opposite end of which is pivoted in upright block 49 for the purpose of magnifying the movement of the segment when the stick is moved. It will thus be seen that when the stick is moved forward the segment will be swung backward, and vice versa. A cord 54, fastened to the front end of segment 51, extends backwardly in the grooved rim and through an eyelet 56 fastened to upright block 49 and then forward beneath rudder bar bracket 42 into anchor tube 23. Another cord 57, connected to the opposite end of the segment, passes along the rim directly to the anchoring tube. These two cords, like the rudder control cords, extend along the tubes to the plane where they emerge and are connected to elevators 3.

Connected to the rear side of upright block 49 is a segment 58 having a grooved rim 59 (Fig. 5). Cords 61 and 62, connected to the opposite ends of this segment, cross each other in the grooved rim and extend through eyelet brackets 63 mounted on the control support. From there they extend beneath the rudder bar bracket and into the tubes, their opposite ends being connected to ailerons 2 of the airplane for tilting or banking it when the stick is tilted laterally in a corresponding manner.

The manner in which the various control cords are connected to the movable control surfaces of the airplane is as follows. All of the cords enter the airplane through two openings 66 in the upper end of upright tube 14, and, as shown in Fig. 6, at that point they are divided and half of them extend up each side of the motor and through eyelets 67 located at the connections between bifurcated bracket 15 and the motor. From these eyelets all of the cords extend back through a center eye 68 in a cross member 69 rigidly disposed in the center of the rear portion of the fuselage (Fig. 7).

Rudder control cords 43 pass out of opposite sides of the tail of the plane through eyes 71 and back in the grooved rim of a circular lever 72 connected to the rudder and substantially concentric with the axis on which the rudder turns, the ends of the two cords being connected to the circular lever at its most rearward points on opposite sides of the rudder.

Cords 54 and 57 which move the elevators extend directly back from center eye 68 to a circular lever 73 having a grooved rim and concentrically mounted on the elevator shaft 74 inside the fuselage. These cords are connected to lever 73 in the same manner as the rudder cords are connected to lever 72.

Aileron cord 61 extends from center eye 68 through an eyelet bracket 76 mounted behind and above it, and cord 62 extends through an eyelet bracket 77 mounted in the bottom of the tail. To the end of cord 61 two branch cords 78 and 79 are connected which are divided and extend forward in the airplane and into the wings through eyes 81 in the fuselage. The top and bottom faces of the wings are provided with eyes 82 directly in front of circular levers 83 which are joined to the ailerons for manipulating them, and cord 78 emerges from a wing through its upper eye 82 and cord 79 emerges from the other wing through its lower eye 82. The ends of these two cords are attached to circular levers 83 in the same manner as previously described, whereby when cord 61 is pulled by tilting the control stick laterally one aileron is raised and the other is lowered.

Cord 62 likewise is provided with branches 84 and 86 which divide and enter the wings through eyes 81 from which they emerge through eyes 82, cord 84 passing through the lower eye and cord 86 through the upper eye. These cords are then attached to levers 83 for moving the ailerons in directions opposite to those in which the other cords move them.

The electric cord 87 that connects electric motor 7 to a suitable electric supply source also preferably extends back through the upright tubes and along the bottom of tube 19 to control stick 44 up which it extends to a rheostat 88 by which the current supply to the motor can be varied by the operator or pilot.

This toy is also provided with a map 91 which is laid on the floor beneath the plane and long tube 19, and a chart 92 that is placed on a table 93 mounted on the forward end of control support 26. The map may be of any locality desired, but the latitude and longitude of the points of interest are indicated thereon. A bifurcated pointer 94 straddles upright tube 22 and extends forward over the chart with its rear end pivoted to the lower end of an arm 96 which is rigidly connected to long tube 19. Flange 36 is high enough to support the pointer and keep it from scraping on the chart.

The chart is provided with intersecting lines which are so drawn and numbered that when the airplane is flying above any given point on map 91 the latitude and longitude of that point is pointed to on the chart by the pointer which moves with long tube 19. The chart is also provided with spaced circular lines which are arbitrarily numbered to indicate altitude, the smallest circle having the highest number because the pointer will be drawn back toward that circle as the airplane rises with the long tube.

In order to permit the pilot at the controls to drop toy articles such as bombs, mail bags, parachutes and the like from the plane and onto map 91 below it, the central portion of the fuselage is provided with a vertically disposed dispensing chamber defined by walls 101, best shown in Figs. 8 and 9. This chamber is open at its top for loading it with the articles desired to be dropped, such as toy bombs 102, and is open at the bottom to permit the bombs to be ejected. The bombs are retained in the dispenser by a retaining member having a lower flange 103 projecting inwardly through a slot 104 in wall 101 and supporting the lowermost bomb. The retaining member is attached to a vertical pin 106 journalled in lugs 107 struck out from wall 101, and has a forwardly projecting central portion 108 which is biased against the dispenser wall by a wire spring 109 rigidly connected to wall 101. The upper portion of the retaining member has an outwardly extending flange 111 adapted to pass through a slot 112 in wall 101 and into the dispenser when the retaining member is rotated by a cord 113 attached to forwardly projecting portion 108. Flanges 103 and 111 are so spaced apart as to permit upper flange 111 to slide beneath the second bomb from the bottom for supporting it while lower flange 103 slides from below the lowest bomb and permits it to drop. Cord 113 extends back through eyelet bracket 77, forward through center eye 68, and out of the plane and along the tubes to the control support where it extends up stick 44 to a trigger 114.

If the pilot wishes to drop a bomb on a certain point on map 91, he first ascertains the latitude and longitude of that point and then guides the airplane in its flight until the pointer indicates that latitude and longitude on the chart. The airplane is then over the point on the map on which the bomb is to be dropped. The pilot then raises trigger 114 which pulls cord 113 against the resistance of spring 109 on the bomb dispenser. This turns the bomb-retaining member and releases the lowermost bomb from the plane.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. An aircraft toy comprising an aircraft-simulating toy having a propeller and control surfaces, means for driving the propeller to cause said aircraft to rise into the air, a yoke pivotally supporting the aircraft on a horizontal axis and having a tubular base, an upright tube loosely telescoped in said tubular base for rotatably supporting it, an elongate member hinged at one end on a horizontal axis to said upright tube and at its opposite end to the upper end of a second upright from which it extends laterally, an upright anchoring tube loosely telescoped in the latter tube to permit rotation of the latter tube thereon, means for holding said first upright tube upright regardless of the position of the elongate member, means connected to the elongate member for substantially counterbalancing the aircraft, remote control means, and cords connecting the remote control means to the aircraft control surfaces, said cords passing through said tubes.

2. An aircraft toy comprising an aircraft-simulating toy having a propeller and control surfaces, a support, elongate rigid means movably connected at one end to said support for universal movement and connected at the opposite end to said aircraft toy for universal movement, means for driving the propeller to cause the aircraft to rise into the air, aircraft control means mounted on said support, cords connecting the control means to the aircraft for manipulating said control surfaces to control the position of the aircraft in the air, a position-indicating chart mounted on said support, and means actuated by the movements of the aircraft for indicating on the chart the relative positions of the aircraft.

3. An aircraft toy comprising a support, an elongate rigid supporting member movably connected for universal movement at one end to the support and extending laterally therefrom, an aircraft-simulating toy having movable control surfaces and mounted for universal movement above the free end of said elongate member, means for causing said aircraft to rise into the air, aircraft control means mounted on said support, and means connecting the control means to said control surfaces for manipulating them whereby to control the position of the aircraft in the air.

4. An aircraft toy comprising a support, an elongate tube movably connected at one end to the support and extending laterally therefrom, an aircraft-simulating toy having movable control surfaces and mounted for universal movement above the free end of said tube, means for causing said aircraft to rise into the air, aircraft control means mounted on said support, means connecting the control means to said control surfaces for manipulating them, said tube being formed of telescoping sections, and removable means for locking said sections together in untelescoped relation.

5. An aircraft toy comprising a support, an elongate rigid supporting member movably connected for universal movement at one end to the support and extending laterally therefrom, an aircraft-simulating toy having movable control surfaces and mounted for universal movement above the free end of said elongate member, means for causing said aircraft to rise into the air, aircraft control means mounted on said support, a relatively small guiding member mounted in the longitudinal axis of the aircraft, and cords connecting the control means to said control surfaces for manipulating them, all of said cords passing through said guiding member before reaching said control surfaces.

6. An aircraft toy comprising an aircraft-simulating toy having a propeller and control surfaces, a support, a map disposed adjacent the support, elongate rigid means disposed above the map and movably connected at one end to said support for universal movement and connected at the opposite end to said aircraft toy for universal movement, means for driving the propeller to cause said aircraft to rise into the air and hover over said map, aircraft control means mounted on said support, cords connecting the control means to the aircraft for manipulating said control surfaces to control the position of the aircraft in the air, a position-indicating chart mounted on said support, and means actuated by the movements of the aircraft for indicating on the chart the positions of the aircraft relative to predetermined positions on the map.

7. An aircraft toy comprising an aircraft-simulating toy having control surfaces, means for causing the aircraft to rise into the air, a support, elongate rigid means movably connected at one end to said support and at the opposite end to said aircraft toy, aircraft control means mounted on said support, cords connecting the control means to the aircraft for manipulating said control surfaces to control the position of the aircraft in the air, a receptacle disposed in the aircraft, a plurality of toy articles disposed as a column in the receptacle, retractable retaining means for supporting said articles in the receptacle, means for supporting all but the lowest article when said retaining means is retracted, and means operated from a remote point in the vicinity of said support for retracting said retractable means to release the lowest article from the receptacle.

SIDNEY N. HOLMAN.

CERTIFICATE OF CORRECTION.

Patent No. 2,034,298.   March 17, 1936.

SIDNEY N. HOLMAN.

It is hereby certified that error appears in the printed specification of the above numbered patent requiring correction as follows: Page 1, second column, line 30, strike out the words "airplane; and Fig. 10 an enlarged" and insert instead the words and period forward end of the fuselage.; page 3, second column, line 47, claim 1, after "upright" insert the word tube; page 4, first column, line 12, claim 4, after "connected" insert the words for universal movement; and that the said Letters Patent should be read with these corrections therein that the same may conform to the record of the case in the Patent Office.

Signed and sealed this 21st day of April, A. D. 1936.

Leslie Frazer
Acting Commissioner of Patents.

(Seal)